(12) United States Patent
Heaps et al.

(10) Patent No.: US 12,422,074 B2
(45) Date of Patent: Sep. 23, 2025

(54) VACUUM HOSE CONNECTION SYSTEM (71) Applicant: VACUUM TECHNOLOGIES, LLC, Sheridan, WY (US)

(72) Inventors: Justin Taylor Heaps, Ranchester, WY (US); Steve W. Lieneman, Sheridan, WY (US); Jared Leroy Meacham, Sheridan, WY (US); Clay D. Price, Sheridan, WY (US); Eldered Tom Tucker, Jr., Sheridan, WY (US); John F. Tucker, Sheridan, WY (US)

(73) Assignee: Vacuum Technologies, LLC, Sheridan, WY (US)

( * ) Notice: Subject to any disclaimer, the term of this patent is extended or adjusted under 35 U.S.C. 154(b) by 49 days.

(21) Appl. No.: 18/270,961

(22) PCT Filed: Jan. 5, 2022

(86) PCT No.: PCT/US2022/011322
§ 371 (c)(1),
(2) Date: Jul. 5, 2023

(87) PCT Pub. No.: WO2022/150395
PCT Pub. Date: Jul. 14, 2022

(65) Prior Publication Data
US 2024/0077159 A1     Mar. 7, 2024

Related U.S. Application Data

(60) Provisional application No. 63/134,005, filed on Jan. 5, 2021.

(51) Int. Cl.
*F16L 37/244* (2006.01)
*A47L 9/24* (2006.01)

(52) U.S. Cl.
CPC ............ *F16L 37/244* (2013.01); *A47L 9/242* (2013.01); *A47L 9/248* (2013.01)

(58) Field of Classification Search
CPC ....... F16L 37/244; F16L 37/248; F16L 27/08; F16L 27/0804; F16L 27/0861;
(Continued)

(56) References Cited

U.S. PATENT DOCUMENTS 3,811,462 A * 5/1974 Feliz ...................... B60R 15/00
                                                                137/355.16
4,152,014 A     5/1979 Soeffker
(Continued)

FOREIGN PATENT DOCUMENTS

KR        19980033864 A     8/1998

OTHER PUBLICATIONS

International Searching Authority, "International Search Report and Written Opinion," issued in connection with PCT/US2022/011322, dated Mar. 25, 2022, 24 pages.
(Continued)

*Primary Examiner* — Aaron M Dunwoody
(74) *Attorney, Agent, or Firm* — Nyemaster Goode P.C.

(57) ABSTRACT

A one-hand engageable vacuum tool connection assembly for connection to a commercial vehicle vacuum system that includes: a vacuum tool connection assembly hose having a first end and a second end; an upper assembly and a lower assembly having a tool connector where the tool connector engages a second end of the lower assembly swivel cuff and is typically adapted to receive one or a plurality of different types of vacuum tools. The vacuum tool engagement assembly is typically free of any flapper valve, metal or spring biased elements.

20 Claims, 11 Drawing Sheets

(58) Field of Classification Search
CPC .......... F16L 27/113; A47L 9/24; A47L 9/242;
A47L 9/248
USPC .......................................................... 285/7
See application file for complete search history.

(56) References Cited

U.S. PATENT DOCUMENTS

| | | | | |
|---|---|---|---|---|
| 5,050,265 | A * | 9/1991 | Stout | A47L 9/242 |
| | | | | 15/340.1 |
| 5,829,091 | A | 11/1998 | Ingram et al. | |
| 5,971,438 | A | 10/1999 | Johnson | |
| 8,465,059 | B1 * | 6/2013 | Price | F16L 27/08 |
| | | | | 285/278 |
| 9,303,802 | B1 | 4/2016 | Price et al. | |
| 10,405,713 | B1 * | 9/2019 | Coltrin | A47L 5/38 |
| 10,865,556 | B2 * | 12/2020 | Wright | E03F 1/008 |
| 10,883,630 | B2 * | 1/2021 | Boutros | E03F 7/00 |
| 2015/0075624 | A1 * | 3/2015 | Mahaffa | F16L 35/00 |
| | | | | 138/109 |
| 2017/0347849 | A1 | 12/2017 | Majer | |

OTHER PUBLICATIONS

International Bureau, "International Preliminary Report of Patentability," issued in connection with PCT/US2022/011322, dated Jul. 20, 2023, 17 pages.

* cited by examiner

VACUUM HOSE CONNECTION SYSTEM

CROSS-REFERENCE TO RELATED APPLICATIONS

This application is a United States National Phase Entry application of International Application No. PCT/US2022/011322, entitled "VACUUM HOSE CONNECTION SYSTEM," filed Jan. 5, 2022, which claims priority to and the benefit of U.S. Provisional Application Ser. No. 63/134,005, entitled "VACUUM HOSE CONNECTION SYSTEM," filed Jan. 5, 2021-all of which are hereby incorporated herein by reference in their entirety, including all references cited therein.

BACKGROUND

Commercial vehicle washing systems often have some form of vacuuming system associated with them. When the vehicle exits the washing tunnel or bay, there is typically some kind of vacuum systems adjacent thereto or within a very short drive to a vacuuming bay or location immediately adjacent the vehicle. The vacuum systems are typically in the form of a single canister vacuum that the user can use to manually vacuum the interior, but can be a multiple bay overhead suspended vacuum system if multiple vehicle vacuum locations are available as is occasionally the case in continuous vehicle commercial washing systems.

Figure 1:
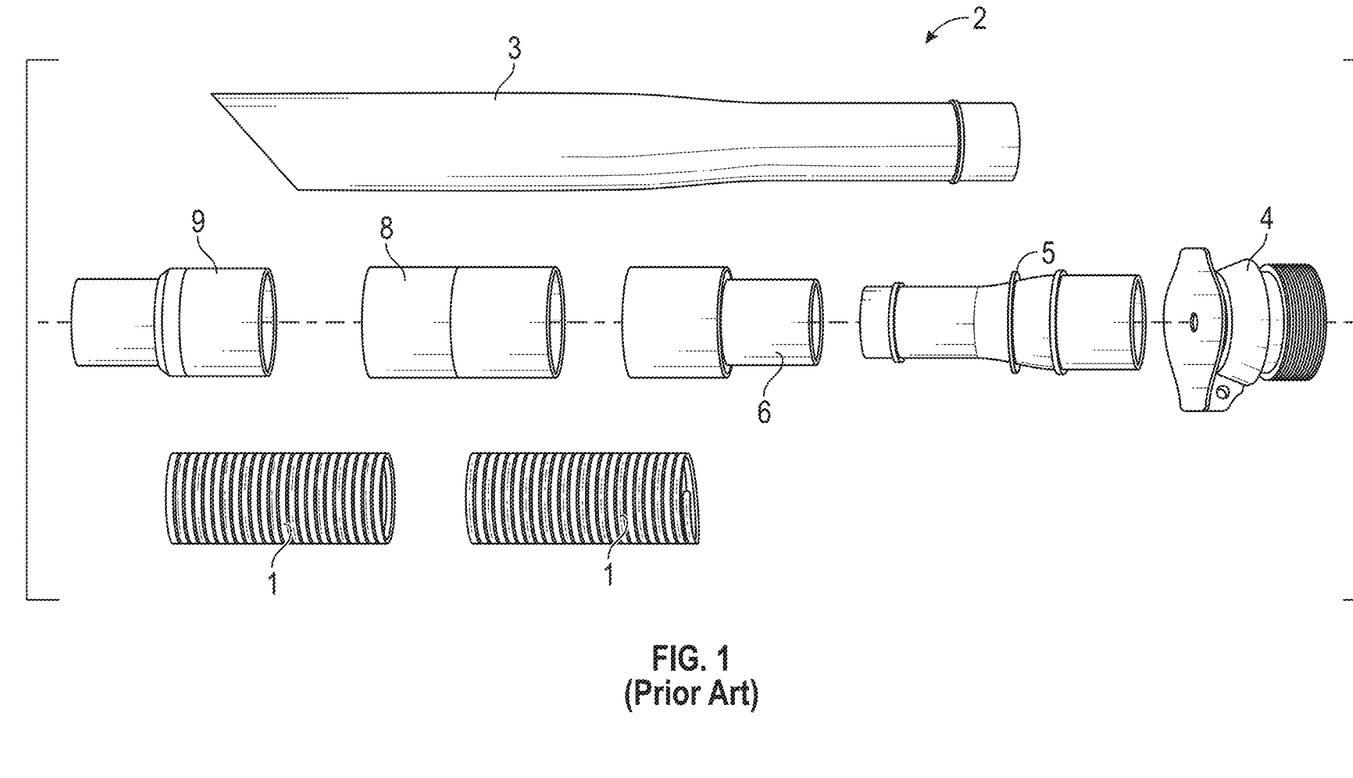
FIG. 1 is an exploded perspective view of a prior art at least partially metal vacuum tool connector assembly with a spring-biased, metal flapper valve connection end.
Figure 2:
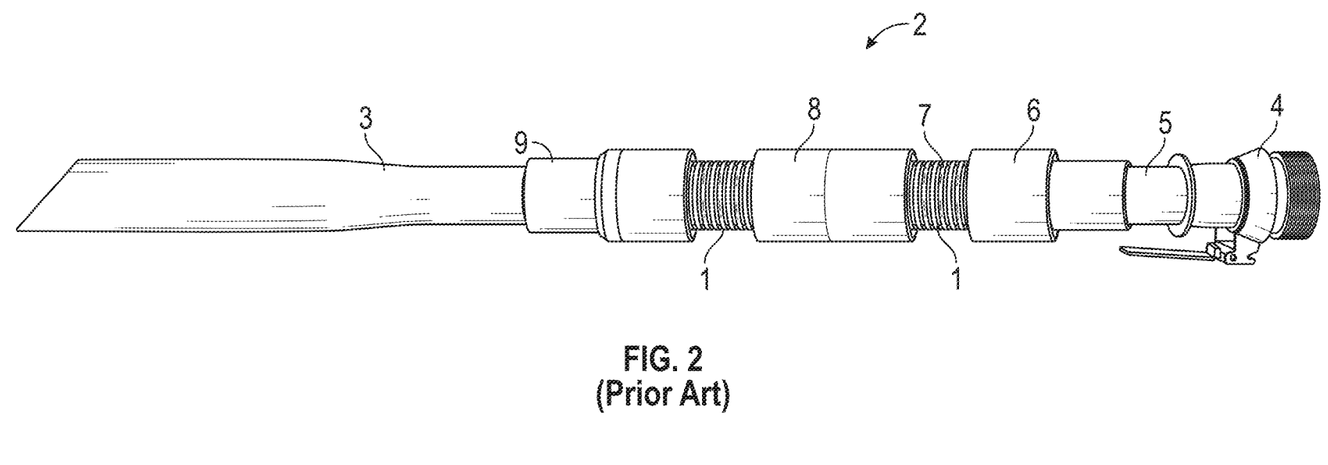
FIG. 2 is an assembled perspective view of a prior art at least partially metal vacuum tool connector assembly with a spring-biased, metal flapper valve connection end.

Currently, as shown in FIGS. 1-2, current commercial overhead vacuum systems employ a series of interconnected components 2 to attach a vacuum tool such as a crevice tool 3 at the user end and a metal flapper connector 4 to connect the overall assembly to the main vacuum line. The metal flapper connector 4 typically has a spring-loaded flapper valve at the end that connects with the main vacuum line. The metal flapper connector 4 and the tool assembly engagement connector 5 are both made of metal due to the need for durability and use of the strong spring biased force to close the flap on the connector, which would damage the tool assembly engagement connector 5 if it were made of any other material such as plastic. The flap is spring biased to the closed position. Two hands are used to open the valve to bias the spring and the flapper into the open position and insert the metal tool assembly engagement connector 5 so the flap is positioned along the side and over a metal lip to engage and couple the components together. The metal tool assembly engagement connector 5 is then engaged to a goblet shaped hose coupling 6 that frictionally engages the narrower end over the opposite end of the metal tool assembly engagement connector 5 and over the exterior of a hose portion 1a. The first hose portion 1a is positioned within a female-female coupling 8 on one end and a second hose portion 1b is positioned within the second end of the female coupling 8. The second hose portion is then positioned within the female coupling end of the vacuum tool coupling 9, which has a smaller diameter opposing female end that receives a circular end of the crevice tool 3. The metal flapper connector loses tension over time, is prone to rusting and damage in the harsh exterior environments of the vacuum locations where these systems are typically used. Additionally, they are difficult to replace due to the need to use two hands to remove them and replace them let alone to simply engage the overall assembly to the main vacuum lines of a modern multiple vehicle vacuum bay systems.

SUMMARY

One aspect of the present disclosure includes a vacuum tool connection assembly for connection to a commercial vehicle vacuum system that includes: a vacuum tool connection assembly hose having a first end and a second end; an upper assembly having a main vacuum line engagement connector that engages an outlet end of a main vacuum system hose line of an overall vacuum system, a swivel connector having a plurality of retaining projections on a first end that each extend away from a perimeter rim of the swivel connector and engage at least one of a plurality of projections on a surface of the main vacuum line engagement connector and where the overall vacuum system provides a vacuum within the vacuum hose line, an upper assembly swivel cuff engaged to the swivel connector, and an upper assembly locking ring engaged with the upper assembly swivel cuff and the vacuum tool connection assembly hose at its first end; and a lower assembly having a tool connector, a lower assembly swivel cuff engaged with the tool connector, and a lower assembly locking ring engaged with the second end of the vacuum tool connection assembly hose and the lower assembly swivel cuff on a first end of the lower assembly swivel cuff. The tool connector engages a second end of the lower assembly swivel cuff and is typically adapted to receive one or a plurality of different types of vacuum tools.

Another aspect of the present disclosure includes a vacuum tool connection assembly for connection to a vehicle vacuuming system having at least one vacuum hose inlet with a main vacuum line engagement connector having projections thereon wherein the vacuum tool connection assembly includes: a vacuum tool connection assembly hose having a first end and a second end; an upper assembly having a swivel connector having a plurality of retaining projections that engage the projections on a first end that each extend away from a perimeter rim of the swivel connector and engage at least one of a plurality of projections on a surface of the main vacuum line engagement connector when rotated into an engaged position, an upper assembly swivel cuff engaged to the swivel connector, and an upper assembly locking ring engaged with the upper assembly swivel cuff and the vacuum tool connection assembly hose at its first end; a coupling assembly comprised of a coupling swivel ring connected between and to a first coupling assembly swivel cuff on a first side of the coupling swivel ring and a second coupling assembly swivel cuff on a second side of the coupling swivel ring; and a lower assembly that includes a tool connector, a lower assembly swivel cuff engaged with the tool connector, and a lower assembly locking ring engaged with the second end of the vacuum tool connection assembly hose and the lower assembly swivel cuff on a first end of the lower assembly swivel cuff. The tool connector typically engages a second end of the lower assembly swivel cuff.

Another aspect of the present disclosure includes a method of forming a vehicle tool assembly that includes the steps of: threadably engaging an upper assembly of components together with one another wherein the upper assembly of components that includes: a swivel connector having a plurality of retaining projections on a first end that each extend away from a perimeter rim of the swivel connector; an upper assembly swivel cuff that engages the swivel connector; and an upper assembly locking ring that engages the upper assembly swivel cuff; threadably engaging a lower assembly of components together with one another wherein the lower assembly of components that includes: a tool connector; a lower assembly swivel cuff engaged with the tool connector; and a lower assembly locking where the tool connector engages a second end of the lower assembly swivel cuff; connecting the upper assembly of components to a first end of a vacuum tool connection assembly hose; and connecting the lower assembly of components to a second end of the vacuum tool connection assembly hose.

Yet another aspect of the present disclosure is generally directed to a method of installing a tool connection assembly into engagement with an end of a vacuum supply hose of a vehicle vacuuming system having a main vacuum line engagement connector that includes a plurality of projections on a surface of the main vacuum line engagement connector that includes the steps of: inserting a vacuum tool connection assembly having a swivel connector having a plurality of retaining hooks on a first end that each extend away from a perimeter rim of the swivel connector; and rotating at least the swivel connector to engage the plurality of projections with the retaining hooks to engage the vacuum tool connection assembly with the end of the vacuum supply hose of the vehicle vacuuming system.

These and other aspects, objects, and features of the present invention will be understood and appreciated by those skilled in the art upon studying the following specification, claims, and appended drawings.

DETAILED DESCRIPTION OF EMBODIMENTS

It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally related to a vacuum hose assembly 10, as shown in FIGS. 3-17, that is typically used most often in connection with commercial car wash facilities employing an overhead vacuum arch system having one or a plurality of vehicle bays or vacuuming locations; however, the location employing a vacuum hose assembly of the present disclosure may be used in other locations such as a residential home or residential dwelling with multiple families such as an apartment or condominium. The vacuum hose assembly systems of the present disclosure may also be used in connection with canister vacuum systems as well as overhead vacuum systems located at car cleaning facilities or elsewhere such as in a home or commercial establishment. When used in connection with a commercial car wash facility employing an overhead vacuum arch system, a user positions their vehicle under or adjacent to the vacuum arch assembly. The vacuum hose assemblies of the present disclosure are engaged to the ends of one or more offshoot vacuum pipes of a main vacuum system that typically provides vacuum forces to each, more typically all of a plurality of offshoots of the overall vacuum hose system. It enables quick connect and disconnection from the main hose line using a single hand while eliminating rusting and other issues that will be discussed further herein.

It should be known by one of ordinary skill that the vacuum hose assemblies may be attached to individual canister vacuums located at each vehicle bay, or any other central or individual vacuum source that can reach each vehicle bay. Further, while the typical sizes of the individual elements and specifically the attaching elements may be sized to fit a commercial car wash vacuum system, the elements may be sized to fit a household vacuum system as well without deviating from the disclosure.

Figure 3:
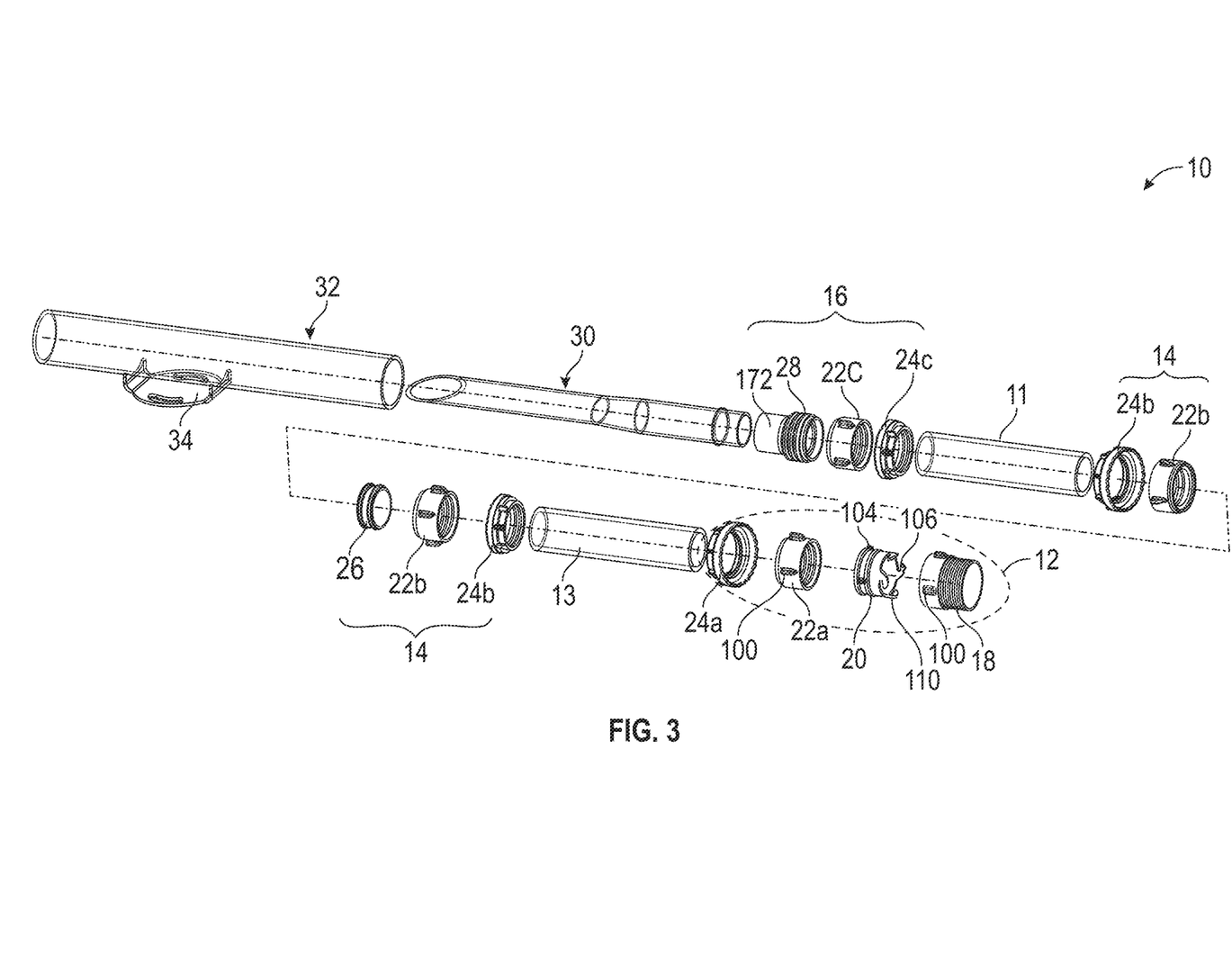
FIG. 3 is an exploded view of the vacuum hose assembly according to an aspect of the present disclosure.
Figure 4:
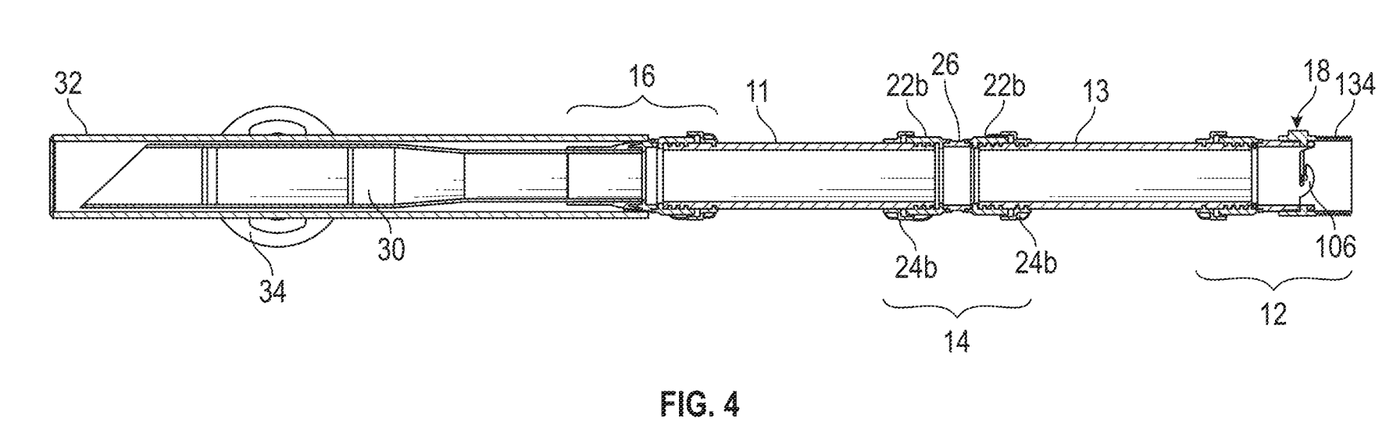
FIG. 4 is a cross-sectional view of an exemplary overall vacuum hose assembly within a crevice tool holder according to an aspect of the present disclosure.
Figure 5:
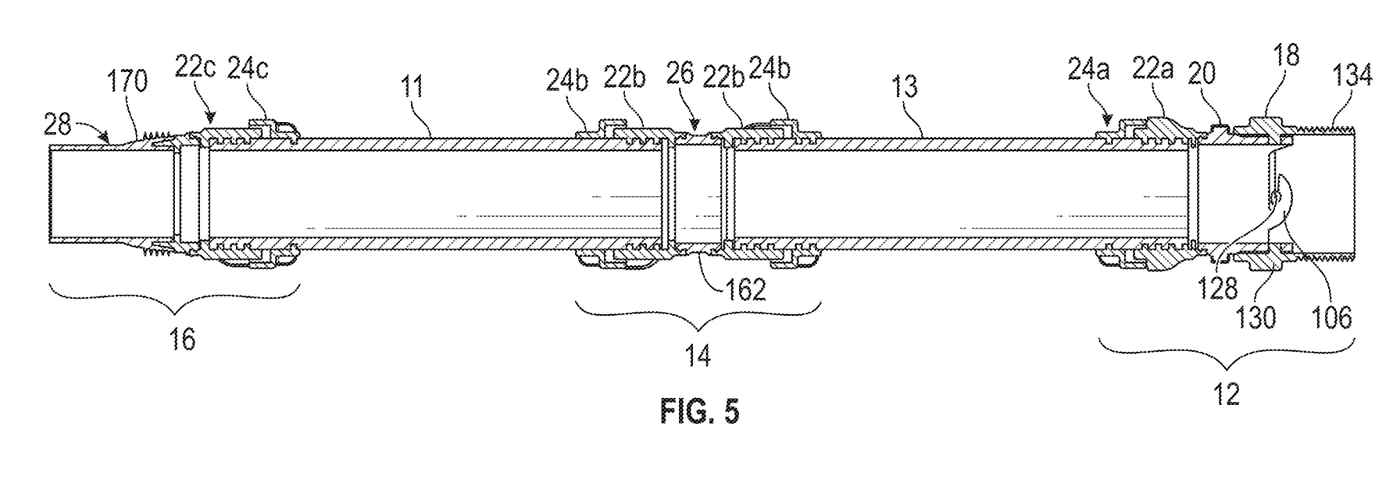
FIG. 5 is a cross-section view of a vacuum hose assembly according to an aspect of the present disclosure without the crevice tool holder shown.

As shown in FIG. 3, which is an exploded view of a vacuum hose assembly according to the present disclosure, the vacuum hose assembly may include an upper assembly 12, a coupling assembly 14, and a lower assembly 16. The overall connection system may be ultimately engaged with a crevice tool 30, however it should be known by one of ordinary skill that the attached tool 30 may be a round brush, a utility nozzle with or without a brush, upholstery tool, or any other another vacuum tool known in the art. The vacuum tool is typically friction fit into engagement with the distal most end of the vacuum hose assembly's lower assembly 16.

A vacuum hose segment 11, which can conceivably be of any length and may be rigid or semi-rigid to provide some stiffness while still allowing for some flexibility, is typically positioned between the lower assembly 16 and the coupling assembly 14. A vacuum hose segment 13, which can also conceivably be of any length and may be rigid or semi-rigid to provide some stiffness while still allowing for some flexibility, is typically engaged with and positioned between the upper assembly 12 and the coupling assembly 14. In each instance, a locking ring 24 is typically used to engage the vacuum hose with the individual assembly.

The upper assembly 12 typically includes a threaded connector 18, which threadably engages a main vacuum hose line operably connected with the air flow line of the commercial vacuum facility/system. The upper assembly 12 further includes a swivel quick connect, which allows for quick connection and disconnection of the vacuum hose assembly from the vacuum hose of the overall vacuum system. The swivel quick-connect 20 also serves as a male swivel for the connection at the main vacuum line of the vacuum arch system. The swivel quick connect operably engages the threaded connector 18. The upper assembly 12 further includes a locking ring 24a, which engages the vacuum hose segment 13, and a threaded swivel cuff 22a positioned between the locking ring 24a and the swivel quick-connect 20.

The overall upper assembly enables the systems of the present disclosure to provide single-handed, quick-disconnect of the vacuum hose assembly 10 from a main vacuum line, which is typically an offshoot vacuum line, that is connected to the overall vacuum system of the commercial vacuum location. Additionally, the system eliminates rusting issues that often occur using current metal systems incorporating a flapper valve. Additionally, the connection is smoother and provides a more air-leak proof swivel design. Additionally, the hose segment 13 locked using the locking ring 24a, prevents the hose assembly from coming apart without intentionally doing so, which is a common problem in current systems. Finally, the upper assembly deters theft of hoses because disengaging the hoses requires the know-how of how they are assembled to quickly remove them.

Figure 7:
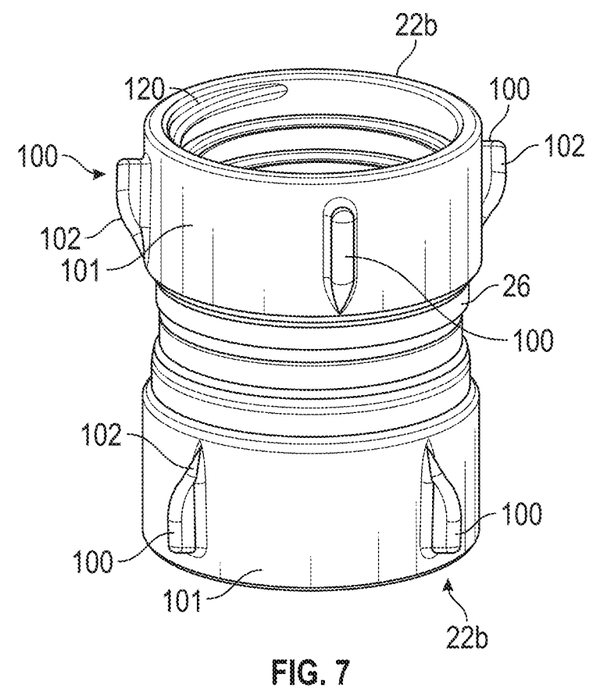
FIG. 7 is a front perspective view of a coupling assembly of the overall vacuum assembly according to an aspect of the present disclosure.

In addition to the upper assembly 12, the hose segment 13 is connected to the coupling assembly 14. The coupling assembly 14 includes two locking rings 24b at each end of the coupling assembly for engagement to vacuum hose segments 11, 13. Between the two locking rings 24b are two threaded cuffs 22b, each operably engaged to one of the locking rings on one end and a coupling swivel 26 on the other. The coupling swivel 26 enables two hoses to be connected together and also rotate. The coupling of the coupling swivel 26 and the two threaded cuffs is shown in FIG. 7. The swivel fittings throughout the hose vacuum systems of the present disclosure typically achieve their swivel functionality through the use of an annular snap fit. In some instances, the swivel connectors may be threaded on the opposing side as shown in the drawings and discussed herein.

The lower assembly 16 includes a locking ring 24c, which as with all of the locking rings engages the hose segment 11 at its narrower end. The lower assembly 16 further typically includes a threaded swivel cuff 22c and a tool connector 28 that are snap fit with one another into a swivel engagement at the tool connector end via the annular snap fitting end of the threaded swivel cuff 22c. The threaded swivel cuff 22c is operably engaged to the locking ring 24c. The threaded portion of the threaded swivel cuff 22c threadably engages the larger diameter end of the locking ring 24c. A vacuum tool such as the crevice tool 30 is typically frictionally engaged within the smaller diameter female connection end of the tool connector 28, which is the end of the tool connector not engaged with the threaded swivel cuff 22c. Alternatively, the tool could be frictionally engaged over the end of the tool connector 28. The crevice tool 30, when not in use by a user, is typically placed within a crevice tool holder 32, which is most often a hollow cylinder. The crevice tool holder 32 is typically engaged with a surface of the vacuum arch assembly of the overall commercial vacuum system via a mounting bracket 34, which is engaged, typically via a weld, adhesive, or other connection system to the crevice tool holder and the arch. The tool holder 32 may have a removable base or a base with an aperture to allow water or other liquid to drain from the holder and prevent corrosion or made from a metal material or prevent accumulation of liquid within the holder in the event of rain, snow or other precipitation.

Figure 6:
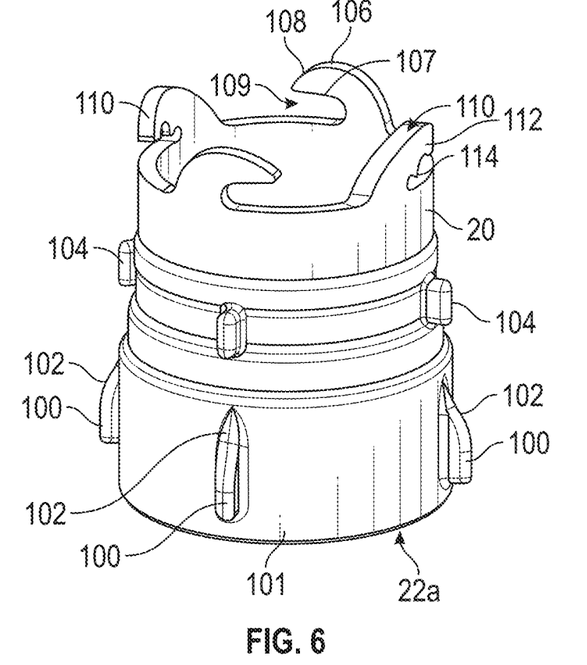
FIG. 6 is a front perspective view of an upper assembly of the overall vacuum assembly according to an aspect of the present disclosure.
Figure 8:
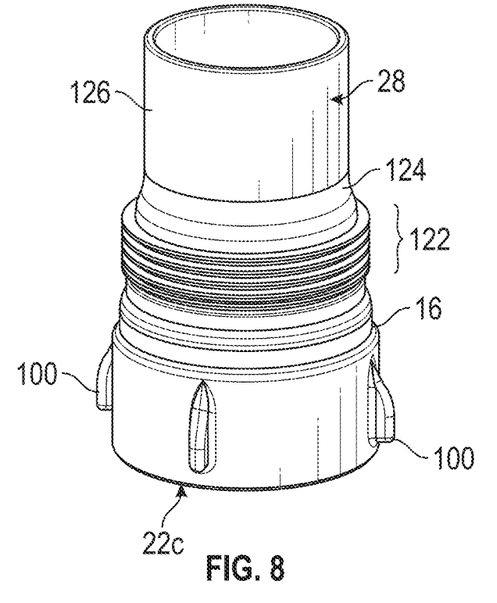
FIG. 8 is a front perspective view of a lower assembly of a vacuum hose assembly according to an aspect of the present disclosure.
Figure 10:
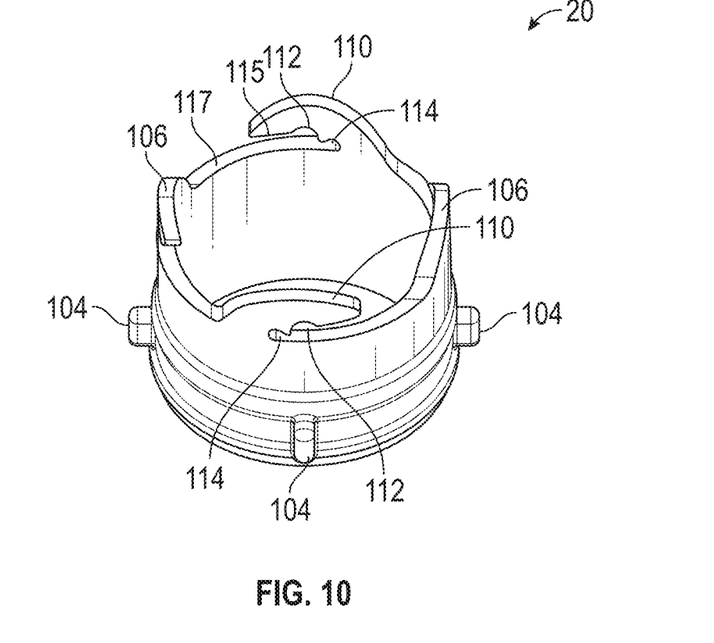
FIG. 10 is a swivel quick connector of the upper assembly shown in FIG. 5 according to an aspect of the present disclosure.
Figure 11:
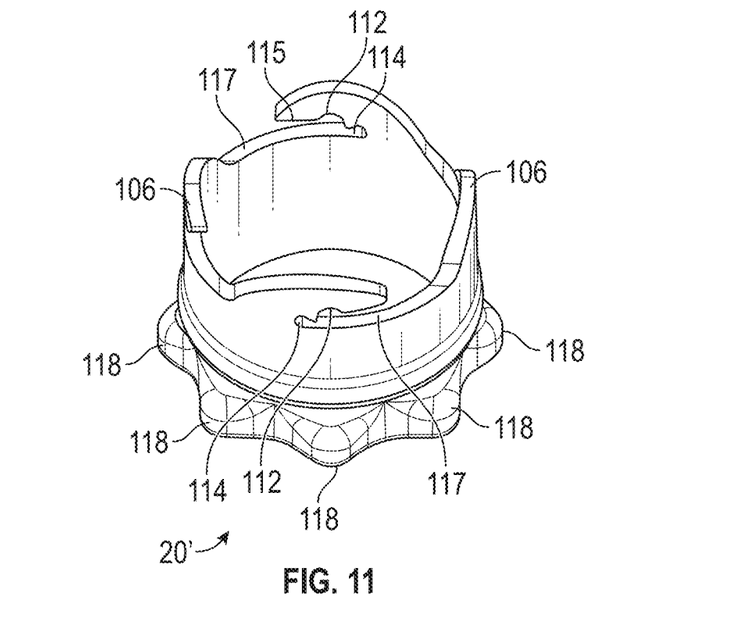
FIG. 11 is a front perspective view of an alternative embodiment of the swivel quick connect according to another aspect of the present disclosure.
Figure 12:
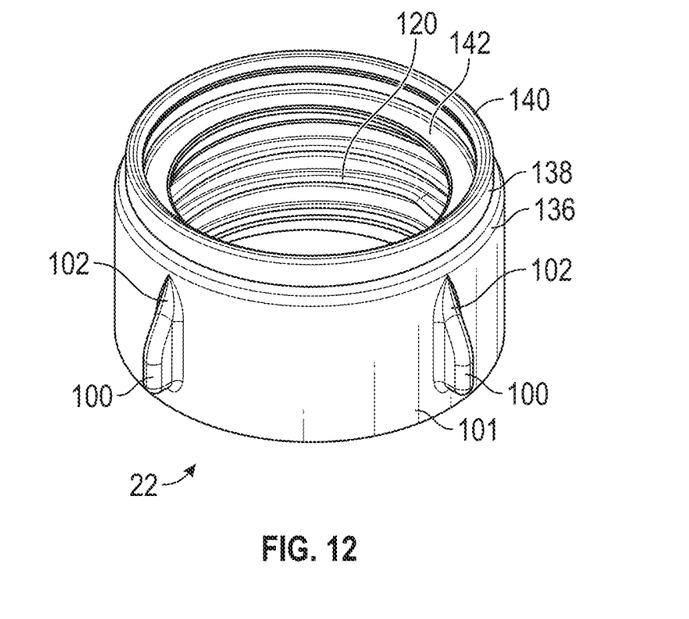
FIG. 12 is a front perspective view of a threaded swivel cuff according to an aspect of the present disclosure.

FIG. 6 shows a threadably assembled threaded swivel cuff 22a and swivel quick connect 20 such as the swivel connect 20 shown in FIG. 10 or the swivel connect 20' shown in FIG. 11. As shown in at least FIGS. 6, 10-12, the threaded swivel cuff 22a has a plurality of outwardly projecting members 100. The plurality of outwardly projecting members 100 are spaced evenly about the outer surface 101 of the threaded swivel cuffs 22a, 22b, 22c. The plurality of outwardly projecting members 100 provide the ability for the user to snap fit the annular portions of the threaded swivel cuffs and rotate the threaded ends into engagement as appropriate to join each of the elements of the hose assembly of the present disclosure together. The portion of the outwardly projecting members facing away from the perimeter that engage the locking rings 24 is an angled portion 102. As best shown in FIG. 12, the opposite end of the threaded swivel cuff 22 typically has a circumferential lip 136 and a top perimeter outer portion 138. The rim 140 typically has a smaller diameter than the outer most surface 101. The threaded swivel cuffs 22 further typically have an interior circumferential shelf 142 and at least one threaded portion 120 below the interior circumferential shelf 142. The top perimeter portion and shelf typically engage the tool connector 28 in the lower assembly, the coupling swivel 26 in the coupling assembly 14 and the bottom of the swivel quick connects 20 of the upper assembly 12 via an annular snap-fit connection, which allows the components to swivel in relation to one another while maintaining a seal with minimal or no loss in vacuum across the connection. The snap fit engagement with the tool connector 28 is shown in FIG. 8. While the swivel connection could conceivably be done with threaded connections 122, the swivel connections are typically achieved via a snap fit annular connection 124 on the shorter end 126 of the threaded cuffs and threaded connections on the longer length.

Figure 9:
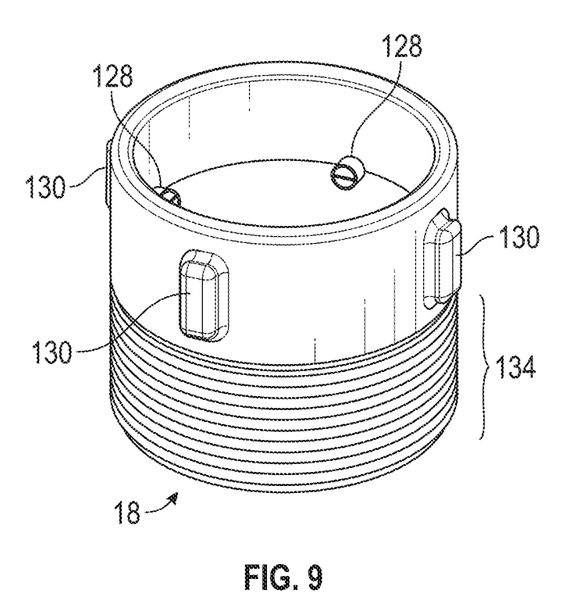
FIG. 9 is a front perspective view of a threaded connection used in the upper assembly according to an aspect of the present disclosure.

As shown in FIG. 6, the outwardly extending finger engaging members 104 are typically cuboidal in shape, but could be any shape. As shown in FIGS. 6, 10 and 11, the swivel quick connect 20 includes a male connection quick disconnect end and male connection swivel end on opposite ends. The male connection quick disconnect end typically has four curvilinear generally hook-shaped retention members. Typically, two opposite curvilinear hook-shaped retention members 110 have a jagged interior surface with a short-angled portion 115, a curved interior portion 112 and a narrow channel 114. The top perimeter 117 of the swivel quick connect extends between the curvilinear hook-shaped retention members. In between the curvilinear hook-shaped retention members 110 are typically at least one additional curvilinear hook-shaped retention projections 106 with an angled portion 108, an interior surface 107 that is typically substantially parallel to the surface 117 that together define a channel 109 that receives the interior lugs 128 of the threaded connector 18. As shown in FIG. 9, the threaded connector 18 typically has a plurality of inwardly projecting lug members 128 that are sized to be matingly received in the channels 109 under the curvilinear hook-shaped retention members 110 and 106 when the user twists the swivel quick connect in to engagement with the inwardly projecting lug members 128. The treaded connector 18 typically has a threaded portion 134 on an exterior surface thereof. It also typically has a plurality of outwardly extending finger engagement members 130 on its outer surface above the threaded portion 134 to enable the user to easily grip and twist the threaded connector 18.

As shown in FIG. 11, the swivel quick connect plug 20' is a plug end used when the hose is disconnected from the overall system. One end of the swivel quick connect plug 20' is completely enclosed so that it plugs and covers the end of the hose line and prevents the loss of vacuum pressure. This plug can have a plurality of curved outwardly extending hump sections 118 instead of the outwardly extending finger engaging members 104. The hump sections 118 and/or the finger engaging members 104 facilitate the gripping and application of a finger force to the piece to enable ready engagement with other threaded portions and hose segments of the present disclosure. The swivel quick connect plug 20' replaces the swivel connect 20 when the hose is not in use.

FIG. 7 shows the two threaded swivel cuffs 22b of the coupling assembly engaged with the coupling swivel 26. The components are typically threadably engaged with one another using finger force applied using the outwardly projecting members 100. The couplings swivel 26 (see FIG. 14) is typically has two male ends 158 and 160 with a center section 162 therebetween, at least one with a male swivel.

Figure 15:
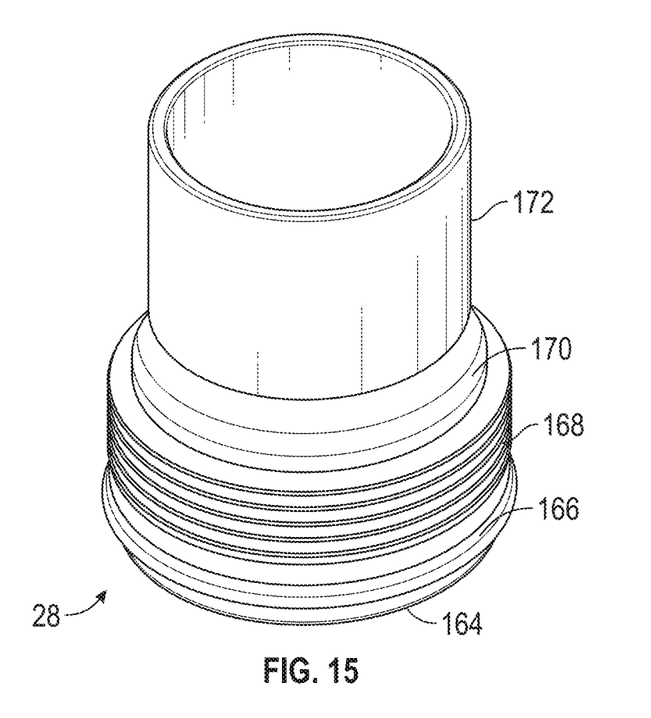
FIG. 15 is a front perspective view of a tool connector according to an aspect of the present disclosure.
Figure 16:
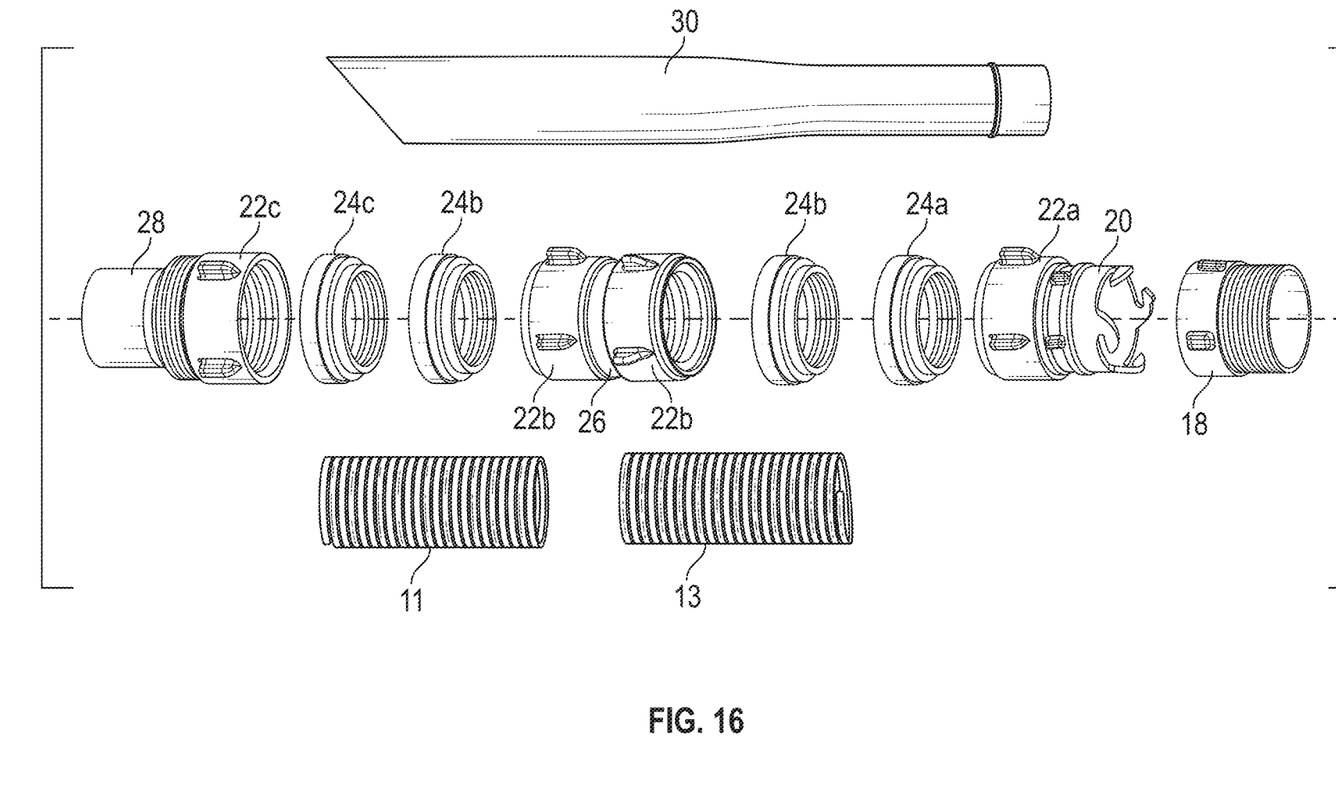
FIG. 16 is an exploded perspective view of a vacuum hose assembly according to an aspect of the present disclosure.
Figure 17:
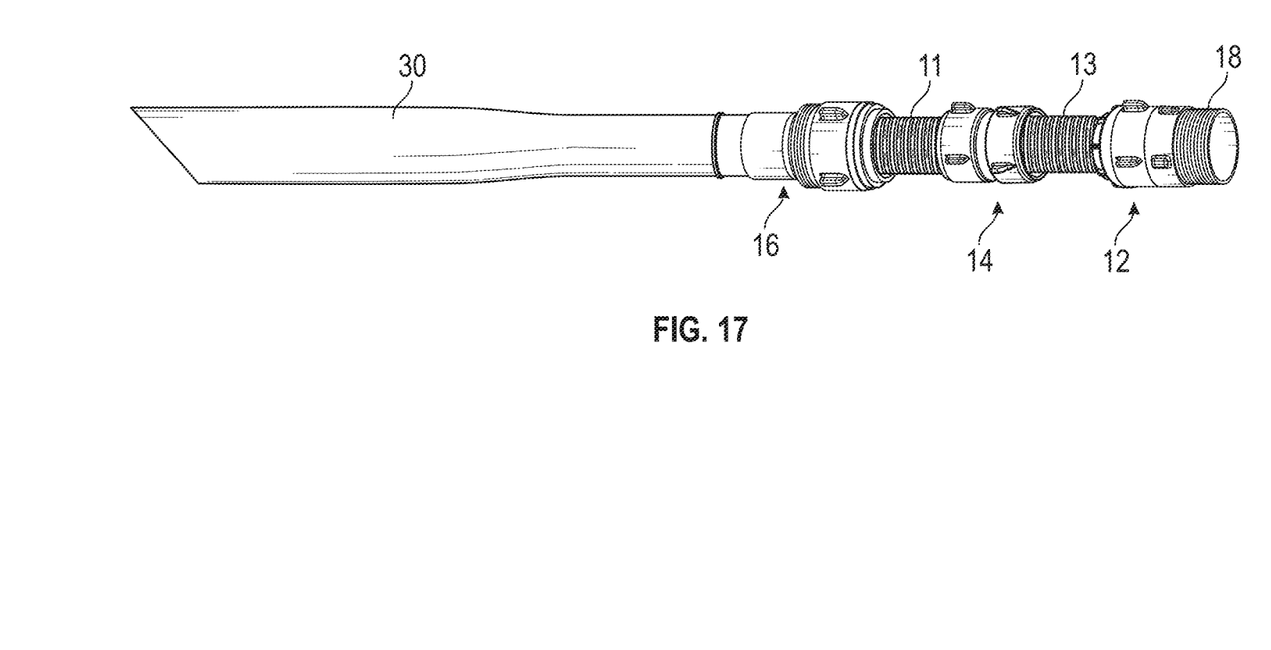
FIG. 17 is a perspective view of an assembled view of a vacuum hose assembly according to an aspect of the present disclosure.

Similarly, FIG. 8 shows the threaded swivel cuff 22c threadably engaged with the tool connector 28. As shown, the tool connector typically contains a threaded portion (see also FIG. 15) that engages the threaded swivel cuff 22c via a snap fit assembly. The threaded portion 166 shown in FIG. 15 is that portion of the connector tool that engages the threaded swivel cuff 22c via the snap fit engagement over the annular portion of the threaded swivel cuff 22c. Additional circular projections 168 having the same or substantially the same diameter as the threaded portion 166 are positioned proximate the treaded portion 166 that extends from the bottom perimeter rim 164. Extending from the circular projections 168 are angled projections 170 that taper to the diameter of the vacuum tool connection end 172. The connection end 172 frictionally fits over (most typically and as shown) or within a vacuum tool. The vacuum tool is most typically a crevice tool used by the user when vacuuming a vehicle interior. Significantly, the circular projections 168 or the circular projections 168 and the angled projections 170 creates a substantially air tight seal, a seal sufficient to prevent substantial loss of vacuum pressure or a completely air tight seal with the tool holder 32 when the vacuum hose assembly is engaged with one another. This mating engagement between the tool holder and the overall assembly prevents any significant loss of vacuum forces at other stations within an overall vacuum system with multiple vacuum stations that might noticeably impact users at other stations within the overall multi-station commercial vacuum system when multiple vacuum locations are utilized.

Figure 13:
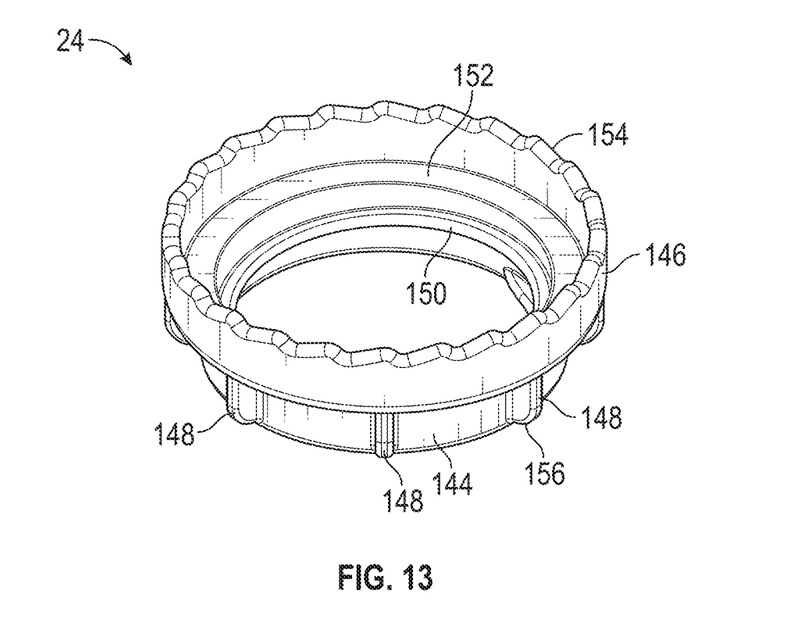
FIG. 13 is a front perspective view of a locking ring according to an aspect of the present disclosure.
Figure 14:
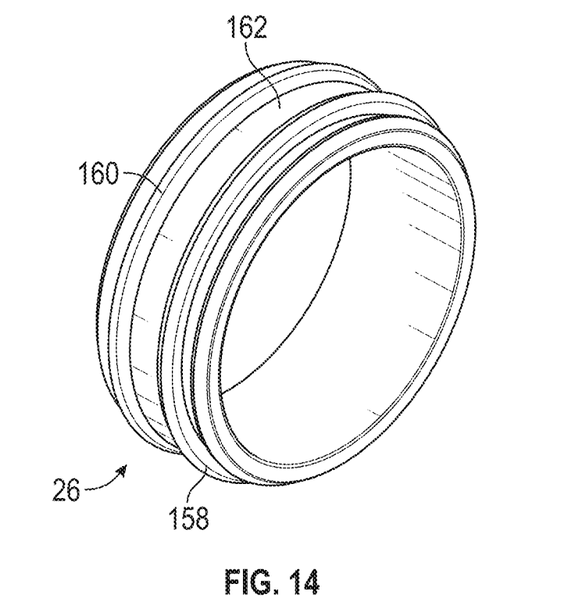
FIG. 14 is a front perspective view of a coupling swivel according to an aspect of the present disclosure.

As shown in FIG. 13, a locking ring 24 according to the present disclosure typically contains a lower portion 144 having a smaller diameter than the upper portion 146. Along the lower portion 144 are a plurality of typically evenly spaced projections 148 having curved or angled ends 156. The projections 148 provide an easy griping surface for the user to engage and provide a finger actuated circumferential force to the ring 24. The perimeter portion 154 around the perimeter of the locking ring 24 is typically a jagged edge portion with a plurality of notched grooves that are angled. On the interior surface of the locking member, there is an inwardly projecting circumferential lip 152 and threaded portions 150 thereunder. The overall locking ring prevents the vacuum hose it is engaged with from untethering and serves as a jam nut.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vacuum tool connection assembly for connection to a commercial vehicle vacuum system comprising:
   an upper vacuum hose having a first end and a second end;
   a lower vacuum hose having a first end and a second end;
   an upper assembly comprising:
      a main vacuum line engagement connector that engages an outlet end of a main vacuum system hose line of an overall vacuum system;
      a swivel connector having a plurality of retaining projections on a first end that each extend away from a perimeter rim of the swivel connector and engage a plurality of projections on a surface of the main vacuum line engagement connector and where the overall vacuum system provides a vacuum within the vacuum hose line;
      an upper assembly swivel cuff engaged to the swivel connector; and
      an upper assembly locking ring engaged with the upper assembly swivel cuff and the upper vacuum hose at the first end of the upper vacuum hose; and
   a lower assembly comprising:
      a tool connector;
      a lower assembly swivel cuff engaged with the tool connector; and
      a lower assembly locking ring engaged with the second end of the lower vacuum hose and the lower assembly swivel cuff; and
   a coupling assembly comprising:
      an upper coupling assembly locking ring and a lower coupling assembly locking ring attached to the second end of the upper vacuum hose and the first end of the lower vacuum hose, respectively;
      first and second swivel cuffs attached to the upper coupling assembly locking ring and the lower coupling assembly locking ring;
      a coupling swivel rotatably coupled to the first and second swivel cuffs and wherein the lower assembly swivel cuff is chosen from the group consisting of (1) a male connection received in a female connection end of the lower assembly locking ring; and (2) a female connector that receives a vacuum tool into engagement therewith.

2. The vacuum tool connection assembly of claim 1, wherein the upper assembly locking ring is threadably and removably engaged by hand and without the use of tools with both the upper assembly swivel cuff and a vacuum tool connection assembly hose at the first end of the vacuum tool connection assembly; wherein the upper assembly is free of any spring biased flap valve; and wherein the vacuum tool connection assembly is free of any spring biased structural component used to engage or disengage the vacuum tool connection assembly with the commercial vehicle vacuum system and wherein the lower assembly locking ring is removably engaged to the second end of the lower vacuum hose by hand and without the use of tools.

3. The vacuum tool connection assembly of claim 1, wherein the lower assembly locking ring further comprises a plurality of projections thereon and extending away from an exterior surface thereof sufficient to allow for finger gripping and the application of finger rotational force;
   wherein the upper assembly locking ring is removably engaged to the first end of the upper vacuum hose by hand and without the use of tools;
   wherein the upper assembly locking ring further comprises a plurality of projections thereon and extending away from an exterior surface thereof sufficient to allow for finger gripping and the application of finger rotational force; and
   wherein the upper assembly locking ring and the lower assembly swivel cuff each comprise a plurality of finger grip projections extending away from an exterior surface thereof.

4. The vacuum tool connection assembly of claim 1, wherein the plurality of retaining projections comprise a first configuration of retaining projections and a second configuration of retaining projections, wherein the first configuration has a leg segment that extends away from the swivel connector and an arm section that extends away from the leg segment and also above a perimeter rim of the swivel connector.

5. The vacuum tool connection assembly of claim 4, wherein the arm section of the first configuration does not contain a jagged perimeter rim facing surface and the arm section of the second configuration has a jagged perimeter rim facing surface.

6. The vacuum tool connection assembly of claim 1, wherein the vacuum tool is received by the lower assembly swivel cuff by hand and without the use of tools.

7. A vacuum tool connection assembly for connection to a commercial vehicle vacuum system comprising:
   a vacuum tool connection assembly hose having a first end and a second end;
   an upper assembly comprising:
      a main vacuum line engagement connector that engages an outlet end of a main vacuum system hose line of an overall vacuum system;
      a swivel connector having a plurality of retaining projections on a first end that each extend away from a perimeter rim of the swivel connector and engage at least one of a plurality of projections on a surface of the main vacuum line engagement connector and where the overall vacuum system provides a vacuum within the vacuum hose line;
      an upper assembly swivel cuff engaged to the swivel connector; and
      an upper assembly locking ring engaged with the upper assembly swivel cuff and the vacuum tool connection assembly hose at the first end of the vacuum tool connection assembly hose; and
   a lower assembly comprising:
      a tool connector;
      a lower assembly swivel cuff engaged with the tool connector; and
      a lower assembly locking ring engaged with the second end of the vacuum tool connection assembly hose and the lower assembly swivel cuff on a first end of the lower assembly swivel cuff;
      wherein the tool connector engages a second end of the lower assembly swivel cuff; and
      wherein a vacuum motor is remote from the vacuum tool connection assembly.

8. The vacuum tool connection assembly of claim 7, wherein the vacuum tool connection assembly can be removably engaged with a plurality of different vacuum tools by hand and without the use of tools and wherein the vacuum tools are chosen from the group consisting of a crevice tool, a dusting brush, an upholstery tool, a pet grooming tool, and a powered brush with rotating brushes within a brush head.

9. The vacuum tool connection assembly of claim 7, wherein the upper assembly locking ring is threadably and removably engaged by hand and without the use of tools with both the upper assembly swivel cuff and the vacuum tool connection assembly hose at the first end of the vacuum tool connection assembly hose.

10. The vacuum tool connection assembly of claim 7, wherein the upper assembly is plastic and free of metal and wherein the upper assembly is free of any spring biased flap valve.

11. The vacuum tool connection assembly of claim 7 further comprising a coupling assembly comprised of a coupling swivel ring connected between and to a first coupling assembly swivel cuff on a first side of the coupling swivel ring and a second coupling assembly swivel cuff on a second side of the coupling swivel ring; and
wherein the coupling swivel ring and the first coupling assembly swivel cuff are threadably engaged with one another and the coupling swivel ring and the second coupling assembly swivel cuff are threadably engaged with one another.

12. The vacuum tool connection assembly of claim 11, wherein the vacuum tool connection assembly hose has two segments, a first segment between the upper assembly and the coupling assembly and a second segment between the coupling assembly and the lower assembly and wherein the first segment and the second segment of the vacuum tool connection assembly hose are disconnected from one another.

13. The vacuum tool connection assembly of claim 4, wherein the lower assembly locking ring and the lower assembly swivel cuff each comprise a plurality of finger grip projections extending away from an exterior surface thereof.

14. The vacuum tool connection assembly of claim 7, wherein the tool connector is threadably and removably engaged with the lower assembly swivel cuff by hand and without the use of tools.

15. The vacuum tool connection assembly of claim 7, wherein the lower assembly locking ring is threadably and removably engaged with the upper assembly swivel cuff by hand and without the use of tools.

16. The vacuum tool connection assembly of claim 7, wherein the first end of the lower assembly swivel cuff is a male connection received in a female connection end of the lower assembly locking ring and wherein the second end of the lower assembly swivel cuff is a female connector that receives a vacuum tool into engagement therewith.

17. The vacuum tool connection assembly of claim 7, wherein the plurality of retaining projections comprise a first configuration of retaining projections and a second configuration of retaining projections, wherein the first configuration has a leg segment that extends away from the swivel connector and an arm section that extends away from the leg segment and also above a perimeter rim of the swivel connector and wherein the arm section of the first configuration does not contain a jagged perimeter rim facing surface and the arm section of the second configuration has a jagged perimeter rim facing surface.

18. The vacuum tool connection assembly of claim 7, wherein the plurality of retaining projections comprise a first configuration of retaining projections and a second configuration of retaining projections, wherein the first configuration has a leg segment that extends away from the swivel connector and an arm section that extends away from the leg segment and also above a perimeter rim of the swivel connector and wherein the plurality of retaining projections each engage a corresponding inwardly projecting lug sized to frictionally fit within a channel defined by a space between the arm section of each of the plurality of retaining projections and the perimeter rim of the swivel connector.

19. A vacuum tool connection assembly for connection to a vehicle vacuuming system having at least one vacuum hose inlet with a main vacuum line engagement connector having projections thereon wherein the vacuum tool connection assembly comprises:
a vacuum tool connection assembly hose having a first end and a second end;
an upper assembly comprising:
a swivel connector having a plurality of retaining projections that engage the projections on a first end that each extend away from a perimeter rim of the swivel connector and engage at least one of a plurality of projections on a surface of the main vacuum line engagement connector when rotated into an engaged position;
an upper assembly swivel cuff engaged to the swivel connector; and
an upper assembly locking ring engaged with the upper assembly swivel cuff and the vacuum tool connection assembly hose at the first end of the vacuum tool connection assembly hose;
a coupling assembly comprised of a coupling swivel ring connected between and to a first coupling assembly swivel cuff on a first side of the coupling swivel ring and a second coupling assembly swivel cuff on a second side of the coupling swivel ring; and
a lower assembly comprising:
a tool connector;
a lower assembly swivel cuff engaged with the tool connector; and
a lower assembly locking ring engaged with the second end of the vacuum tool connection assembly hose and the lower assembly swivel cuff on a first end of the lower assembly swivel cuff; and
wherein the tool connector engages a second end of the lower assembly swivel cuff.

20. The vacuum tool connection assembly of claim 19, wherein the vacuum tool connection assembly can be removably engaged with a plurality of different vacuum tools by hand and without the use of tools and wherein the vacuum tools are chosen from the group consisting of a crevice tool, a dusting brush, an upholstery tool, a pet grooming tool, and a powered brush with rotating brushes within a brush head.

* * * * *